United States Patent
Knudson et al.

(10) Patent No.: US 10,963,466 B2
(45) Date of Patent: Mar. 30, 2021

(54) CONTEXTUAL ASSOCIATIONS FOR ENTITY QUERIES

(71) Applicant: Lenovo (Singapore) Pte. Ltd., Singapore (SG)

(72) Inventors: Ryan Charles Knudson, Durham, NC (US); Jindal Kushagra, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 207 days.

(21) Appl. No.: 15/406,973

(22) Filed: Jan. 16, 2017

(65) Prior Publication Data
US 2018/0203905 A1    Jul. 19, 2018

(51) Int. Cl.
*G06F 17/00* (2019.01)
*G06F 16/2457* (2019.01)
*G06F 16/9535* (2019.01)

(52) U.S. Cl.
CPC .... *G06F 16/24575* (2019.01); *G06F 16/9535* (2019.01)

(58) Field of Classification Search
CPC ......... G06F 17/30528; G06F 17/30867; G06F 17/3043; G06F 17/30471; G06F 17/30522; G06F 17/30752; G06F 17/30761; G06F 17/30828; G06F 17/30935; G06F 16/24575; G06F 16/9535
USPC ....... 707/721, 722, 768, 769, 771, 777, 780, 707/811
See application file for complete search history.

(56) References Cited

U.S. PATENT DOCUMENTS

| | | | |
|---|---|---|---|
| 8,645,390 B1* | 2/2014 | Oztekin | G06F 16/9535 707/748 |
| 2005/0149496 A1* | 7/2005 | Mukherjee | G06F 16/24575 |
| 2009/0113346 A1* | 4/2009 | Wickramasuriya | G06F 3/0481 715/825 |
| 2009/0193099 A1* | 7/2009 | Partridge | G06F 17/30867 709/219 |
| 2010/0274804 A1* | 10/2010 | Muskal | G06F 16/951 707/769 |
| 2011/0225192 A1* | 9/2011 | Imig et al. | G06F 17/30646 707/775 |
| 2014/0229462 A1* | 8/2014 | Lo | G06F 16/24575 707/707 |
| 2015/0269231 A1* | 9/2015 | Huynh | G06F 16/951 707/722 |
| 2016/0350383 A1* | 12/2016 | Lim | G06F 17/30528 |
| 2017/0083821 A1* | 3/2017 | Foerster | G06N 7/005 |
| 2017/0132019 A1* | 5/2017 | Karashchuk | H04W 4/12 |
| 2017/0147951 A1* | 5/2017 | Meyer | G06Q 50/14 |
| 2017/0316022 A1* | 11/2017 | Joshi | G06Q 30/0631 |
| 2017/0323342 A1* | 11/2017 | Dey | G06Q 30/0267 |
| 2018/0196869 A1* | 7/2018 | Altaf | G06F 16/36 |

* cited by examiner

*Primary Examiner* — Greta L Robinson
(74) *Attorney, Agent, or Firm* — Ference & Associates LLC

(57) ABSTRACT

One embodiment provides a method, including: receiving, at an information handling device, query input from at least one user, wherein the query input comprises at least one entity; accessing, using a processor, contextual history data associated with the at least one user; determining, using the contextual history data, a contextual association for the at least one entity; and generating output associated with the contextual association for the at least one entity. Other aspects are described and claimed.

20 Claims, 3 Drawing Sheets

CONTEXTUAL ASSOCIATIONS FOR ENTITY QUERIES

BACKGROUND

Information handling devices ("devices"), for example smart phones, tablet devices, laptop computers, personal computers, and the like, are capable of receiving query input from a user and subsequently generating results associated with that input. For example, a device can receive query input when a user is providing input to a search engine, interacting with a digital assistant, providing commands to the device or an application on the device, and the like. Oftentimes, the query input may contain a term, such as a proper noun (e.g., related to a person, place, thing, etc.), that may have numerous connotations.

BRIEF SUMMARY

In summary, one aspect provides a method, comprising: receiving, at an information handling device, query input from at least one user, wherein the query input comprises at least one entity; accessing, using a processor, contextual history data associated with the at least one user; determining, using the contextual history data, a contextual association for the at least one entity; and generating output associated with the contextual association for the at least one entity.

Another aspect provides an information handling device, comprising: a processor; a memory device that stores instructions executable by the processor to: receive query input from at least one user, wherein the query input comprises at least one entity; access contextual history data associated with the at least one user; determine, using the contextual history data, a contextual association for the at least one entity; and generate output associated with the contextual association for the at least one entity.

A further aspect provides a product, comprising: a storage device that stores code, the code being executable by a processor and comprising: code that receives query input from at least one user, wherein the query input comprises at least one entity; code that accesses contextual history data associated with the at least one user; code that determines, using the contextual history data, a contextual association for the at least one entity; and code that generates output associated with the contextual association for the at least one entity.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
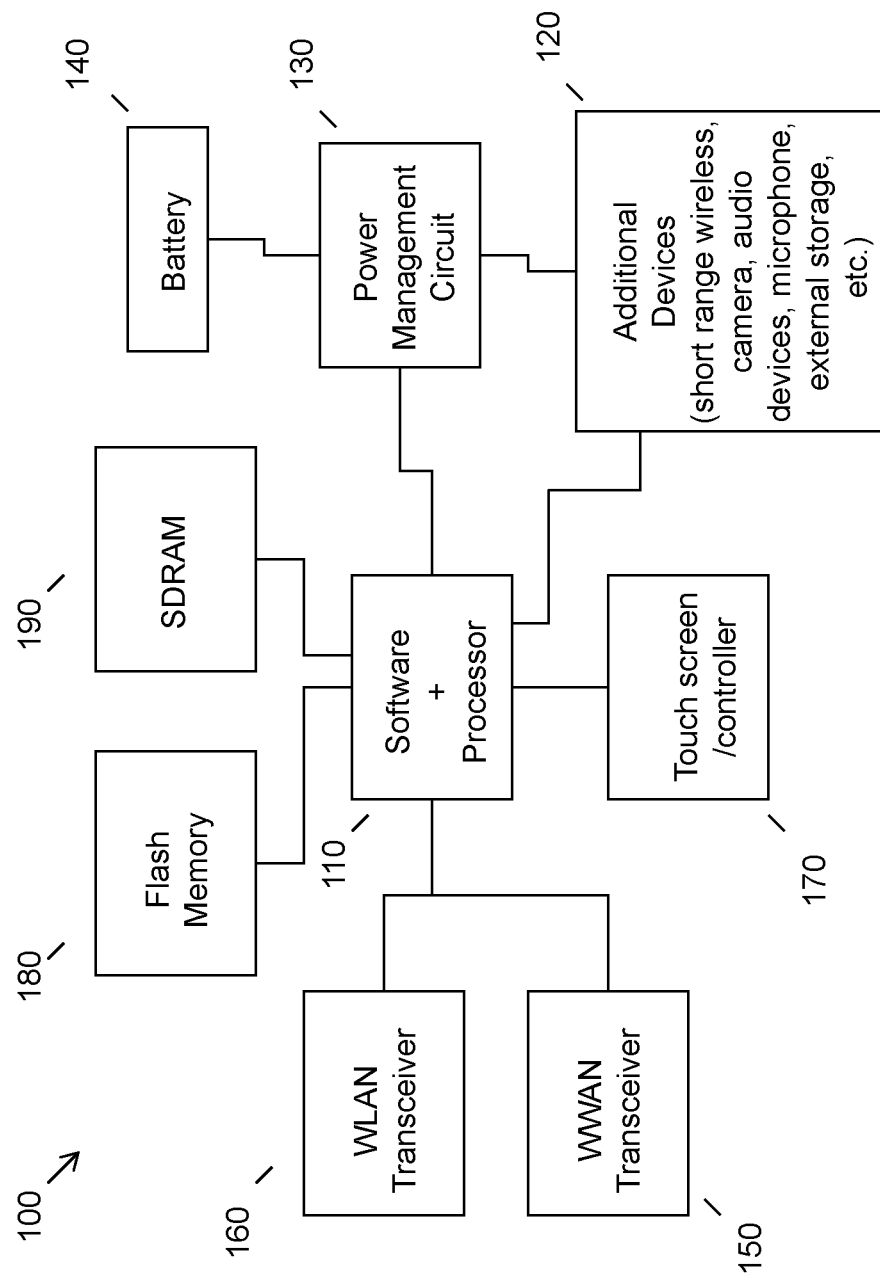
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Entity terms (e.g., proper nouns associated with particular people, places, things, etc.) are often present in user-provided query input (e.g., text input, touch input, voice input, etc.). Devices (e.g., smart phones, tablets, laptop computers, personal computers, etc.) are capable of receiving the query input containing one or more entities (e.g., in a search field, in a search box, via a personal assistant request, etc.) and generating output (e.g., search results, responsive actions, etc.) associated with that input. For example, a user may enter or provide the phrase, "where can I find the best pizza in Gainesville?" into a search engine application (e.g., Google®, Yahoo®, etc.) or to a personal assistant device (e.g., Cortana®, Siri®, etc.). Responsive to identifying the location entity, Gainesville, the application may output numerous clickable results containing information for pizza restaurants in or around cities named "Gainesville." However, because entities often have duplicate meanings, for example, Gainesville may be a location in Florida, Texas, and the like, the results may not be optimized for a user's particular situation.

Conventionally, results to query input may be optimized by using location-based filtering techniques. Accordingly, the query output may be based upon the user's current location. One method, for example, may provide query output by utilizing global positioning system (GPS) data associated with a user's device to provide results associated with the user's current location. Using the pizza in Gainesville example above, the user's device may determine (e.g., by accessing the GPS data, by a network address, using location data, etc.) that the user is currently located in Gainesville, Fla. The system may subsequently output information related to pizza restaurants in the Gainesville, Fla., area as opposed to other cities having the same name in different states. Generally the query output is refined by locations that are close to the user's current location.

However, these conventional methods may provide the user with output that is inconsistent with or irrelevant to the intended query. One problem with a location-based filtering method is that a user may not desire to receive query results regarding locations within proximity to the user's current location. For example, a user may live in New Jersey and has recently purchased tickets to go see the Taj Mahal in India in two weeks. When a user provides a query input regarding the Taj Mahal, the user may want to receive results that are relevant to the Taj Mahal in India. However, using the location-based filtering method, when a user provides a query input including the term "Taj Mahal," the system may provide the user with query results related to the Taj Mahal Casino, which is located near the user in New Jersey. These query results may not be helpful to the user.

Accordingly, an embodiment provides a method of generating query output based upon a determined contextual association for an entity. In an embodiment, query input (e.g., text input, touch input, voice input, etc.) received (e.g., in a search field, via a digital personal assistant, etc.) from a user may contain an entity that is associated with a proper noun (e.g., a person, a place, a thing, etc.). An embodiment may access contextual history data associated with the user from at least one source (e.g., social media, email, text messages, calendar, search history, purchase history, etc.) and use the contextual history data to determine a contextual association for the entity. Subsequent to determining a contextual association, an embodiment may generate output (e.g., search results, responsive actions, etc.) that is related to the contextually-associated entity. Such a method may provide users with output that is more relevant to the user's intended query.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
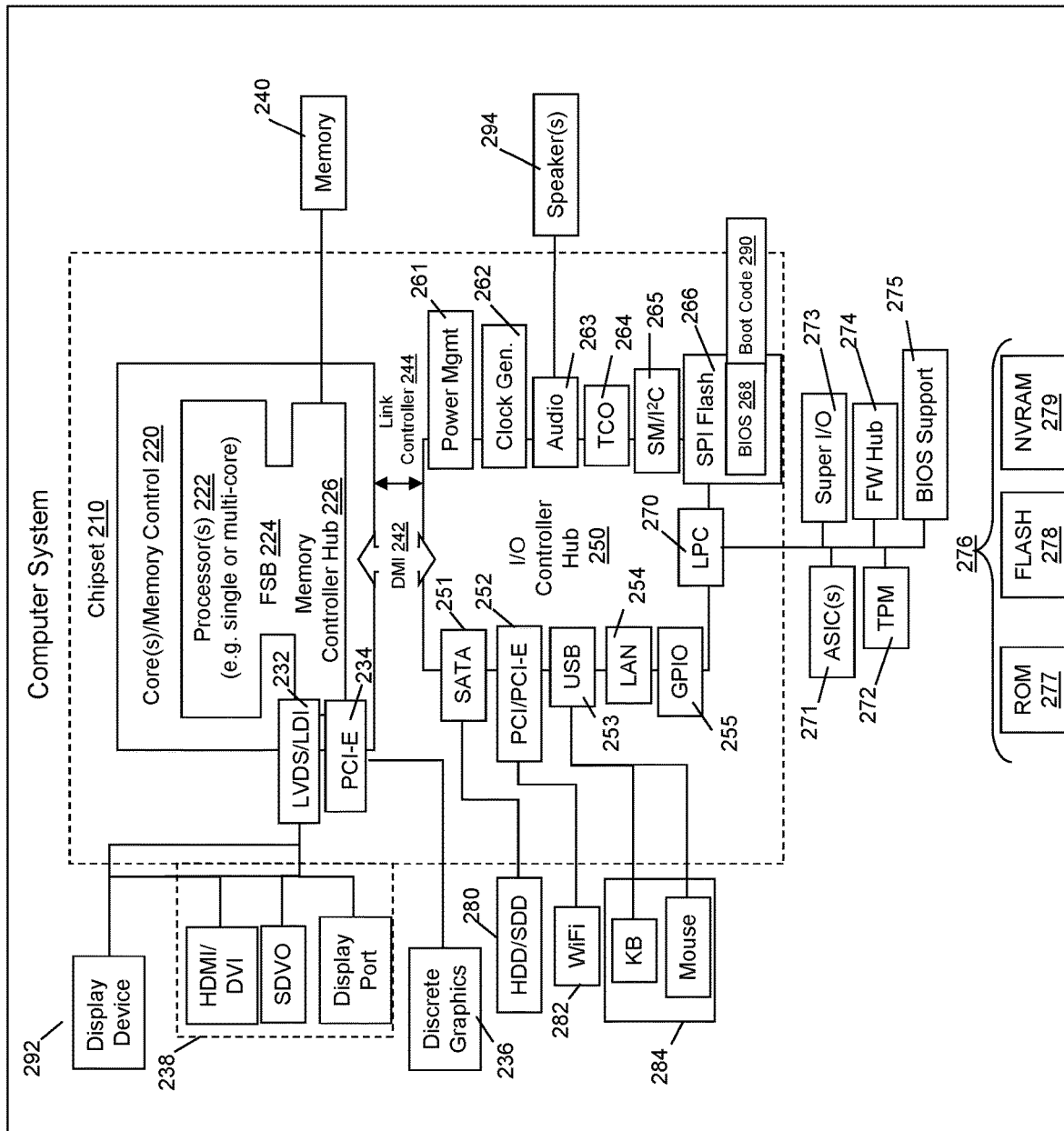
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to search for query results. The devices may also be used to generate output associated with a contextually-associated entity in a query. For example, the circuitry outlined in FIG. 1 may be implemented in a tablet, smart phone, or digital personal assistant embodiment, whereas the circuitry outlined in FIG. 2 may be implemented in a personal computer embodiment.

Figure 3:
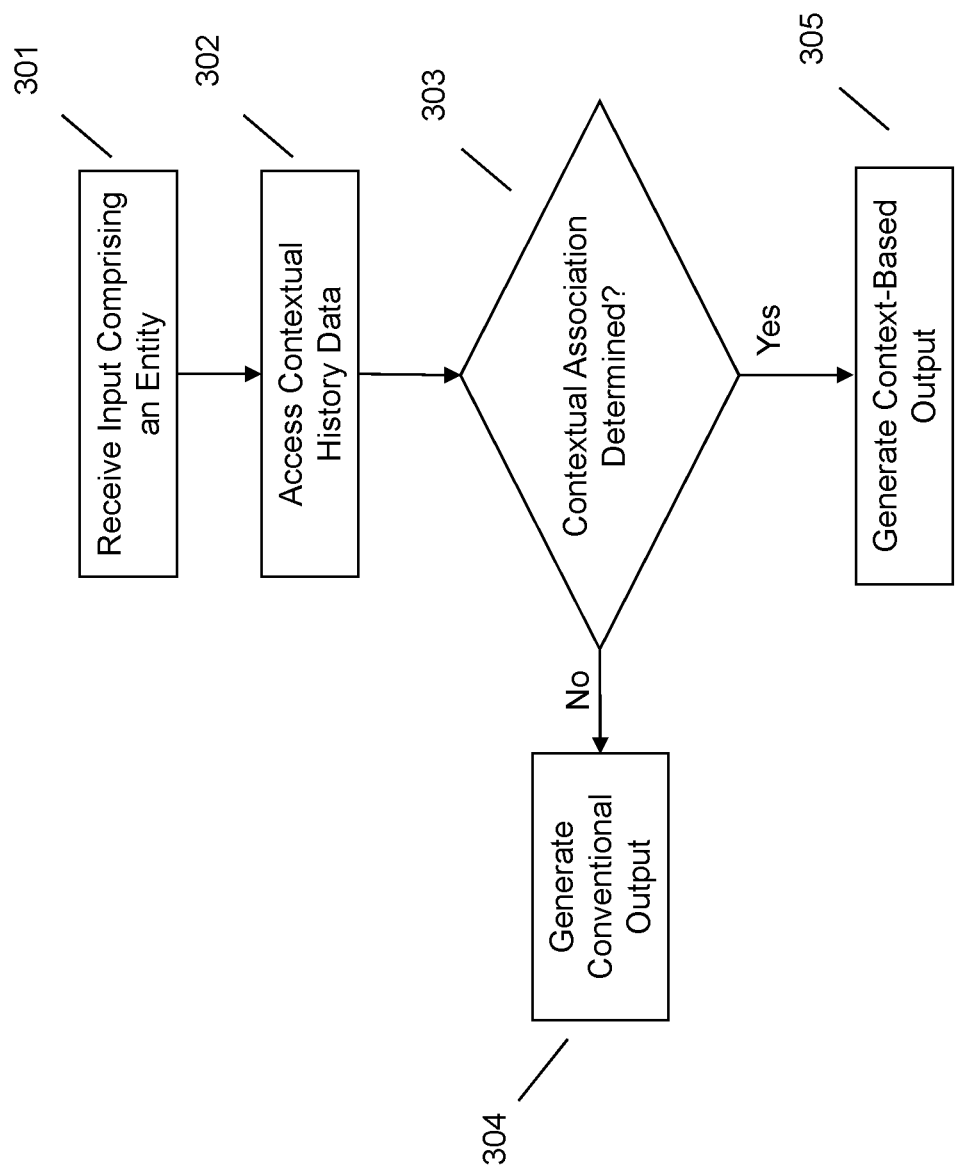
FIG. 3 illustrates an example method of generating output based upon a determined contextual association for an entity.

Referring now to FIG. 3, an embodiment may generate contextually relevant output based upon a determined contextual association for an entity in a user query. At 301, an embodiment may receive, from a user, at an input device (e.g., a microphone, a keyboard, a touch screen, etc.) query input (e.g., touch input, text input, voice input, etc.). The query input may be associated with a search request or other type of query. In an embodiment, the query input may be provided into a search field. For example, a user may type (e.g., using touch input, text input, etc.) a text string containing the query into the input field of an application (e.g., Internet search engine, file folder, database, word processing document, etc.). In one embodiment, a user may provide (e.g., using voice input, gesture input, etc.) a command to a digital assistant. Alternative methods of providing query input that are known in the art may also be used.

In an embodiment, the query input may comprise at least one entity. The entity may be a proper noun associated with a particular person (e.g., a celebrity, a politician, etc.), a particular place (e.g., a city, a country, etc.), or a particular thing (e.g., a brand, an organization, etc.). For example, a user may incorporate the entity term, Patagonia, into the text-based query input "where can I find Patagonia?" In an embodiment, the entity may have multiple meanings or multiple connotations. For example, the entity term, Patagonia, in the aforementioned query may be in reference to the Patagonia mountain range or the Patagonia® clothing brand. Any or all the connotations or meanings of the entity do not have to refer to proper nouns. For example, a user may provide a query with the term "marmot." In one instance, the term marmot may refer to the type of animal. Alternatively, the term marmot may refer to the Marmot® clothing brand. Therefore, the entity included in the query does not have to be strictly referring to a proper noun. Rather, the entity may just have multiple meanings or connotations and may generally refer to a noun, either proper or otherwise.

At 302, an embodiment may access contextual history data associated with a user. In an embodiment, the contextual history data may be accessed from at least one source (e.g., social media, email, text messages, calendar, search history, purchase history, etc.). The contextual data history may be used by an embodiment to assist in determining or identifying a user's intent when the query was provided. In an embodiment, the contextual data may be stored in a data storage location accessible by the system, for example, locally (e.g., on the device, etc.), remotely (e.g., the cloud, network storage location, etc.), or a combination thereof. Contextual history data may include any data providing context associated with the user. For example, contextual history data may include a confirmation email of a purchase of plane tickets. As another example, contextual history data may include a user's calendar entries identifying a work conference at a particular location. As a further example, contextual history data may include social media posts by the user discussing a particular interest of the user. The contextual history data may provide information related to a future location of the user, an interest of the user, user contacts and contact locations, and the like.

Subsequent to accessing one or more contextual data sources, an embodiment may determine, at 303, a contextual association for the entity in the query based upon the contextual data. The contextual association may include using the data obtained from the contextual data store that is related to the entity within the query. For example, a contextual association may be made between the entity and a calendar entry having a relationship with the entity. Using the Taj Mahal example above, the system may identify, from an email message that the user has purchased tickets to travel to India. The system may then make an association between the Taj Mahal listed in the query and the email message indicating Taj Mahal, India. In other words, a contextual association may include an identification of a relationship between the entity included in the query and the contextual history data. As another example, for a user wanting to buy Patagonia® brand clothing, a variety of different contextual data sources may be accessed to make an association between the entity, Patagonia and the clothing brand rather than the mountain range. In one embodiment, for example, an embodiment may access a user's internet search history that contains stored data corresponding to searches (e.g., provided to a search engine, etc.) for Patagonia® sweaters. In another example, an embodiment may access a user's text messages (e.g., that may be stored in a database, stored on the local device, etc.) and identify a recent text message to another user asking "what color Patagonia sweater would you like?" In yet a further example, an embodiment may access a user's calendar, which may contain a reminder placed on a certain day that reads, "Buy John a blue Patagonia® sweater for his birthday."

In an embodiment, the sources of contextual data may be prioritized when determining, at 303, a contextual association for an entity in a query. In some situations, the sources of contextual data may provide conflicting associations for the entity. For example, one contextual data source may indicate one association for an entity while another contextual data source may indicate a different association for the entity. For example, a user may exchange a text message with another user that says "I am looking forward to visiting the Patagonia Mountains with you!" Additionally, the user may also have a reminder on his calendar that reads, "Buy John a blue Patagonia® sweater for his birthday."

In an embodiment, prioritizing the contextual data sources may be based upon the underlying application being used. For example, for a user using an e-commerce application (e.g., eBay®, Amazon®, etc.) to shop online, an embodiment may prioritize the association for an entity indicated by the recent purchase history rather than the association denoted by, for example, social media or another contextual data source. In one embodiment, prioritizing the contextual data sources may be based upon a confidence score. For example, based upon the rest of the query, the system may identify a confidence level associated with a particular connotation of the query. As an example, if the query includes "traveling to Patagonia," the system may prioritize a contextual data source identifying Patagonia as the mountain range because of the term "traveling" included in the query. The confidence score may also be based upon user feedback. For example, the user may indicate that a query result was correct or incorrect. The system may then use this feedback to calculate and assign a confidence score to the contextual data source. Prioritization of the contextual data sources may be accomplished using other methods, for example, a user may indicate a contextual data source prioritization, a historical accuracy of contextual data sources, and the like.

In an embodiment, multiple users may access and use a single device. In such a situation, an embodiment may identify a user prior to accessing contextual data associated with that particular user. For example, multiple users may have the ability to access a device (e.g., a laptop computer, a desktop computer, etc.) by logging into a user profile. Each user profile may contain a variety of settings, including contextual data, which may be specific to the identified user. For example, User A may gain access to a user profile on a device by providing user identification data (e.g., a digital fingerprint, user-associated passcode, user credentials, biometric data, device data, etc.) to an input field on a login screen of the device. Subsequent to granting User A access to their user profile, an embodiment may have access to contextual data associated with User A. If User B logs in to a user profile associated with User B on the same device, an embodiment may access contextual data specific to User B rather than the contextual data associated with User A.

If at 303, an association between the contextual history data and the entity cannot be determined, an embodiment may revert to conventional methods for generating output (e.g., providing results based upon keyword matching location, etc.) at 304. If, however, an association between the contextual history data and the query input can be determined at 303, an embodiment may generate, at 305, output associated with the contextual association. In an embodiment, the output may be search results related to the entity in the query input. For example, for a user searching for Patagonia® brand clothing, an embodiment may generate a list of clickable links that may take a user to websites that sell Patagonia® clothing. Other embodiments may generate alternative output dependent on the application being utilized (e.g., relevant directions may be provided in a mapping application based on the contextually associated entity, etc.). As with the prioritization of the contextual data store, the output to the query may also be prioritized using similar methods. For example, the output may be prioritized based on a confidence score, based on the underlying application, based upon the contextual data store prioritization, and the like.

An embodiment may receive an indication of whether the determined contextual association is relevant to a user's intent based upon a user's reaction to the generated output. For example, if a user provides a query into a search engine and subsequently selects one of the top-listed clickable search results, an embodiment may receive an indication that the contextual association was correct. Conversely, if an embodiment detects that a user does not select a clickable search result and/or subsequently modifies the query input (e.g., by providing additional input, by providing more specific input, etc.), an embodiment may receive an indication that the contextual association was inaccurate. This indication may be used to generate future confidence scores, prioritize future query outputs, and the like.

The various embodiments described herein thus represent a technical improvement to conventional query output techniques. Using the techniques described herein, an embodiment may generate contextually relevant output by determining a contextual association for an entity in a user-generated query. Such techniques provide a user with output results that are more relevant to the user based on the user's contextual situation. Additionally, such techniques eliminate the need for a user to provide additional information (e.g., more specific information, additional input, etc.) to attain output results that are related to their intended query.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, query input from at least one user, wherein the query input comprises an entity having multiple meanings;
accessing, using a processor, contextual history data associated with the at least one user, wherein the contextual history data comprises at least one data source other than a search history;
determining, using the contextual history data, a contextual association for the entity, wherein the determining comprises identifying one of the multiple meanings to be used for performing a query, wherein the identifying assigns a prioritization to each of the multiple meanings for the entity based upon a recentness of the contextual association and assigns a confidence score, wherein the contextual association is based upon an identification of a relationship between the contextual history data and the entity; and
generating output associated with the contextual association for the entity using the identified one of the multiple meanings as determined by the identification of the relationship and the prioritization.

2. The method of claim 1, wherein the entity comprises a proper noun.

3. The method of claim 2, wherein the proper noun is at least one proper noun selected from the group consisting of a person, a place, and a thing.

4. The method of claim 1, wherein the query input comprises at least two entities, wherein each one of the at least two entities is associated with a different contextual association.

5. The method of claim 1, wherein the accessing comprises accessing the contextual history data from at least one source selected from the group consisting of social media, email, text messages, calendar, search history, and purchase history.

6. The method of claim 1, wherein the query input comprises input provided into a search field.

7. The method of claim 1, further comprising identifying the at least one user.

8. The method of claim 7, wherein the identifying comprises receiving user identification data.

9. The method of claim 7, further comprising accessing, based on the identifying, contextual history data associated with the identified at least one user.

10. The method of claim 1, wherein the input comprises input selected from the group consisting of voice input, text input, and touch input.

11. An information handling device, comprising:
a processor;
a memory device that stores instructions executable by the processor to:
receive query input from at least one user, wherein the query input comprises an entity having multiple meanings;
access contextual history data associated with the at least one user, wherein the contextual history data comprises at least one data source other than a search history;
determine, using the contextual history data, a contextual association for the entity, wherein to determine comprises to identify one of the multiple meanings to be used for performing a query, wherein the identifying assigns a prioritization to each of the multiple meanings for the entity based upon a recentness of the contextual association and assigns a confidence score, wherein the contextual association is based upon an identification of a relationship between the contextual history data and the entity; and
generate output associated with the contextual association for the entity using the identified one of the multiple meanings as determined by the identification of the relationship and the prioritization.

12. The information handling device of claim 11, wherein the entity comprises a proper noun.

13. The information handling device of claim 12, wherein the proper noun is at least one proper noun selected from the group consisting of a person, a place, and at thing.

14. The information handling device of claim 11, wherein the query input comprises at least two entities, wherein each one of the at least two entities is associated with a different contextual association.

15. The information handling device of claim 11, wherein the instructions executable by the processor to access comprise instructions executable by the processor to access the contextual history data from at least one source selected from the group consisting of social media, email, text messages, calendar, search history, and purchase history.

16. The information handling device of claim 11, wherein the query input comprises input provided into a search field.

17. The information handling device of claim 11, wherein the instructions are further executable by the processor to identify the at least one user.

18. The information handling device of claim 17, wherein the instructions executable by the processor to identify comprise instructions executable by the processor to receive user identification data.

19. The information handling device of claim 17, wherein the instructions are further executable by the processor to access, based on the identifying, contextual history data associated with the identified at least one user.

20. A product, comprising:
a storage device that stores code, the code being executable by a processor and comprising:
code that receives query input from at least one user, wherein the query input comprises an entity having multiple meanings;
code that accesses contextual history data associated with the at least one user, wherein the context history data comprises at least one data source other than a search history;
code that determines, using the contextual history data, a contextual association for the entity, wherein the code that determines comprises code that identifies one of the multiple meanings to be used for performing a query, wherein the identifying assigns a prioritization to each of the multiple meanings for the entity based upon a recentness of the contextual association and assigns a confidence score, wherein the contextual association is based upon an identification of a relationship between the contextual history data and the entity; and code that generates output associated with the contextual association for the entity using the identified one of the multiple meanings as determined by the identification of the relationship and the prioritization.

\* \* \* \* \*